United States Patent
Kurian

(10) Patent No.: US 10,313,315 B2
(45) Date of Patent: Jun. 4, 2019

(54) ENSURING INFORMATION SECURITY IN DATA TRANSFERS BY UTILIZING PROXIMITY KEYS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 125 days.

(21) Appl. No.: 15/686,762

(22) Filed: Aug. 25, 2017

(65) Prior Publication Data

US 2019/0068563 A1 Feb. 28, 2019

(51) Int. Cl.
*H04L 9/32* (2006.01)
*H04L 29/06* (2006.01)
*H04L 9/08* (2006.01)
*H04L 9/14* (2006.01)
*G06F 21/00* (2013.01)

(52) U.S. Cl.
CPC ............ *H04L 63/0464* (2013.01); *H04L 9/08* (2013.01); *H04L 9/14* (2013.01); *H04L 63/08* (2013.01); *H04L 63/10* (2013.01)

(58) Field of Classification Search
None
See application file for complete search history.

(56) References Cited

U.S. PATENT DOCUMENTS

| 5,548,648 | A  | * | 8/1996  | Yorke-Smith | H04L 9/0869 380/29 |
| 6,490,353 | B1 | * | 12/2002 | Tan | H04L 9/088 380/278 |
| 7,155,605 | B1 | * | 12/2006 | Cromer | G06F 21/6263 713/151 |
| 7,254,232 | B2 | * | 8/2007  | DiSanto | H04L 9/16 380/37 |

(Continued)

OTHER PUBLICATIONS

Klinc, et al., "On Compression of Data Encrypted with Block Ciphers," retrieved from https://eprint.iacr.org/2010/477.pdf, 27 pages.

(Continued)

*Primary Examiner* — Gary S Gracia
(74) *Attorney, Agent, or Firm* — Banner & Witcoff, Ltd.; Michael A. Springs

(57) ABSTRACT

Aspects of the disclosure relate to ensuring information security in data transfers by utilizing proximity keys. A computing platform may receive a data collection comprising one or more data sets to be transferred to one or more remote recipient systems, as well as one or more transfer path specifications defining a specific sequence of hop points via which the data collection is to be transferred. Subsequently, the computing platform may receive, from a quorum of authorization devices, a plurality of authorization keys. Based on validating the plurality of authorization keys, the computing platform may encrypt the data collection using the plurality of authorization keys. Then, the computing platform may send the encrypted data collection to a first hop point associated with the specific sequence of hop points (Continued)

defined by the one or more transfer path specifications, so as to initiate a transfer of the data collection to a decryption platform.

20 Claims, 10 Drawing Sheets

(56) References Cited

U.S. PATENT DOCUMENTS

| | | | | |
|---|---|---|---|---|
| 7,460,672 B2* | 12/2008 | Klein | G06F 21/6218 | |
| | | | 380/278 | |
| 7,650,499 B2* | 1/2010 | Ittogi | H04L 9/0643 | |
| | | | 380/28 | |
| 7,995,754 B2* | 8/2011 | Gabryjelski | G11B 20/00507 | |
| | | | 380/201 | |
| 8,189,769 B2* | 5/2012 | Ramasamy | H04L 9/0637 | |
| | | | 380/28 | |
| 8,296,584 B2* | 10/2012 | Bosch | H04L 9/0643 | |
| | | | 713/193 | |
| 8,375,223 B2* | 2/2013 | DeHaan | G06F 11/1456 | |
| | | | 713/193 | |
| 8,548,164 B2* | 10/2013 | Nourry | H04L 9/12 | |
| | | | 380/270 | |
| 8,559,630 B2 | 10/2013 | Ramasamy et al. | | |
| 8,635,465 B1* | 1/2014 | Juels | G06F 21/602 | |
| | | | 713/193 | |
| 2008/0228821 A1* | 9/2008 | Mick | G06F 21/10 | |
| 2012/0149382 A1* | 6/2012 | Fox | H04W 36/245 | |
| | | | 455/445 | |
| 2013/0291056 A1* | 10/2013 | Gaudet | H04W 12/06 | |
| | | | 726/1 | |
| 2014/0292720 A1* | 10/2014 | Liang | H04L 67/06 | |
| | | | 345/174 | |
| 2016/0191513 A1* | 6/2016 | Tomlinson | H04L 9/321 | |
| | | | 713/168 | |
| 2017/0221052 A1* | 8/2017 | Sheng | G06Q 20/3678 | |
| 2017/0221054 A1* | 8/2017 | Flurscheim | G06K 7/1417 | |
| 2017/0221055 A1* | 8/2017 | Carlsson | G06Q 20/3821 | |
| 2017/0221056 A1* | 8/2017 | Karpenko | G06Q 20/3829 | |
| 2017/0221121 A1* | 8/2017 | Davis | G06F 16/532 | |
| 2017/0222985 A1 | 8/2017 | Trachtenberg et al. | | |
| 2017/0222986 A1* | 8/2017 | Trachtenberg | G06F 1/1626 | |
| 2017/0223022 A1 | 8/2017 | Peterson et al. | | |
| 2017/0223034 A1 | 8/2017 | Singh et al. | | |
| 2017/0223037 A1 | 8/2017 | Singh et al. | | |
| 2017/0223046 A1* | 8/2017 | Singh | H04L 43/062 | |
| 2017/0223093 A1* | 8/2017 | Peterson | G06F 21/604 | |
| 2017/0223097 A1* | 8/2017 | Zhang | H04L 67/1008 | |
| 2017/0223110 A1* | 8/2017 | Lawson | G06Q 10/06315 | |
| 2017/0223248 A1* | 8/2017 | Oshima | H04N 5/2356 | |
| 2017/0223483 A1* | 8/2017 | Granbery | H04W 4/21 | |
| 2017/0223505 A1* | 8/2017 | Baldwin | H04L 29/08657 | |
| 2017/0223807 A1* | 8/2017 | Recker | H05B 37/0272 | |
| 2017/0227965 A1* | 8/2017 | Decenzo | H04L 67/025 | |
| 2017/0228603 A1* | 8/2017 | Johnson | G06K 9/00771 | |
| 2017/0228635 A1* | 8/2017 | Diev | G06N 3/02 | |
| 2017/0228661 A1* | 8/2017 | Chien | G06N 5/04 | |
| 2017/0228711 A1* | 8/2017 | Chawla | G06Q 20/12 | |
| 2017/0228731 A1* | 8/2017 | Sheng | G06Q 20/401 | |
| 2017/0228738 A1* | 8/2017 | Beenau | G06K 9/00 | |
| 2017/0229021 A1* | 8/2017 | McCann | G08G 5/0039 | |
| 2017/0230184 A1* | 8/2017 | Alwarappan | H04L 9/3247 | |
| 2017/0230185 A1* | 8/2017 | Varadhan | G06F 8/63 | |
| 2017/0232300 A1* | 8/2017 | Tran | H04L 67/12 | |
| | | | 434/247 | |
| 2017/0234562 A1* | 8/2017 | Ribbich | G05D 23/1923 | |
| | | | 700/277 | |
| 2017/0235786 A9* | 8/2017 | Faith | G06Q 30/0631 | |
| | | | 707/607 | |
| 2017/0235931 A1* | 8/2017 | Publicover | G06F 21/64 | |
| 2017/0235966 A1* | 8/2017 | Ray | G06F 21/6218 | |
| | | | 713/165 | |
| 2017/0235967 A1* | 8/2017 | Ray | G06F 21/6218 | |
| | | | 713/165 | |
| 2017/0236113 A1* | 8/2017 | Chitalia | G06Q 20/3224 | |
| | | | 705/44 | |
| 2017/0236121 A1* | 8/2017 | Lyons | G06Q 20/102 | |
| | | | 705/71 | |
| 2017/0236132 A1* | 8/2017 | Haxholdt | G06Q 30/0201 | |
| | | | 705/7.29 | |
| 2017/0236193 A1* | 8/2017 | Zundel | G06Q 10/0833 | |
| | | | 705/16 | |
| 2017/0236196 A1* | 8/2017 | Isaacson | G06Q 30/0625 | |
| | | | 705/14.51 | |
| 2017/0236352 A1* | 8/2017 | Conrad | G07C 9/00309 | |
| | | | 340/5.61 | |
| 2017/0236353 A1* | 8/2017 | Conrad | G07C 9/00571 | |
| | | | 713/185 | |
| 2017/0236359 A1* | 8/2017 | Lovell, Sr. | G07F 17/3262 | |
| | | | 463/17 | |
| 2017/0237301 A1* | 8/2017 | Elad | H02J 50/80 | |
| | | | 307/104 | |
| 2017/0237488 A1* | 8/2017 | Aoyama | H04B 10/116 | |
| | | | 398/118 | |
| 2017/0237560 A1* | 8/2017 | Mueller | H04L 9/30 | |
| | | | 713/168 | |
| 2017/0237561 A1* | 8/2017 | Nix | H04W 4/70 | |
| | | | 713/156 | |
| 2017/0237563 A1* | 8/2017 | El-Moussa | G06F 21/44 | |
| | | | 713/193 | |
| 2017/0237732 A1* | 8/2017 | Bando | H04L 63/0876 | |
| | | | 726/6 | |
| 2017/0237747 A1* | 8/2017 | Quinn | H04L 63/107 | |
| | | | 726/29 | |
| 2017/0238129 A1* | 8/2017 | Maier | H04W 4/02 | |
| | | | 455/404.2 | |

OTHER PUBLICATIONS

Kak, Avi, "Lecture 3: Block Ciphers and Data Encryption Standard—Lecture Notes on Computer and Network Security," Jan. 21, 2017, retrieved from https://engineering.purdue.edu/kak/compsec/NewLectures/Lecture3.pdf, 46 pages.

* cited by examiner

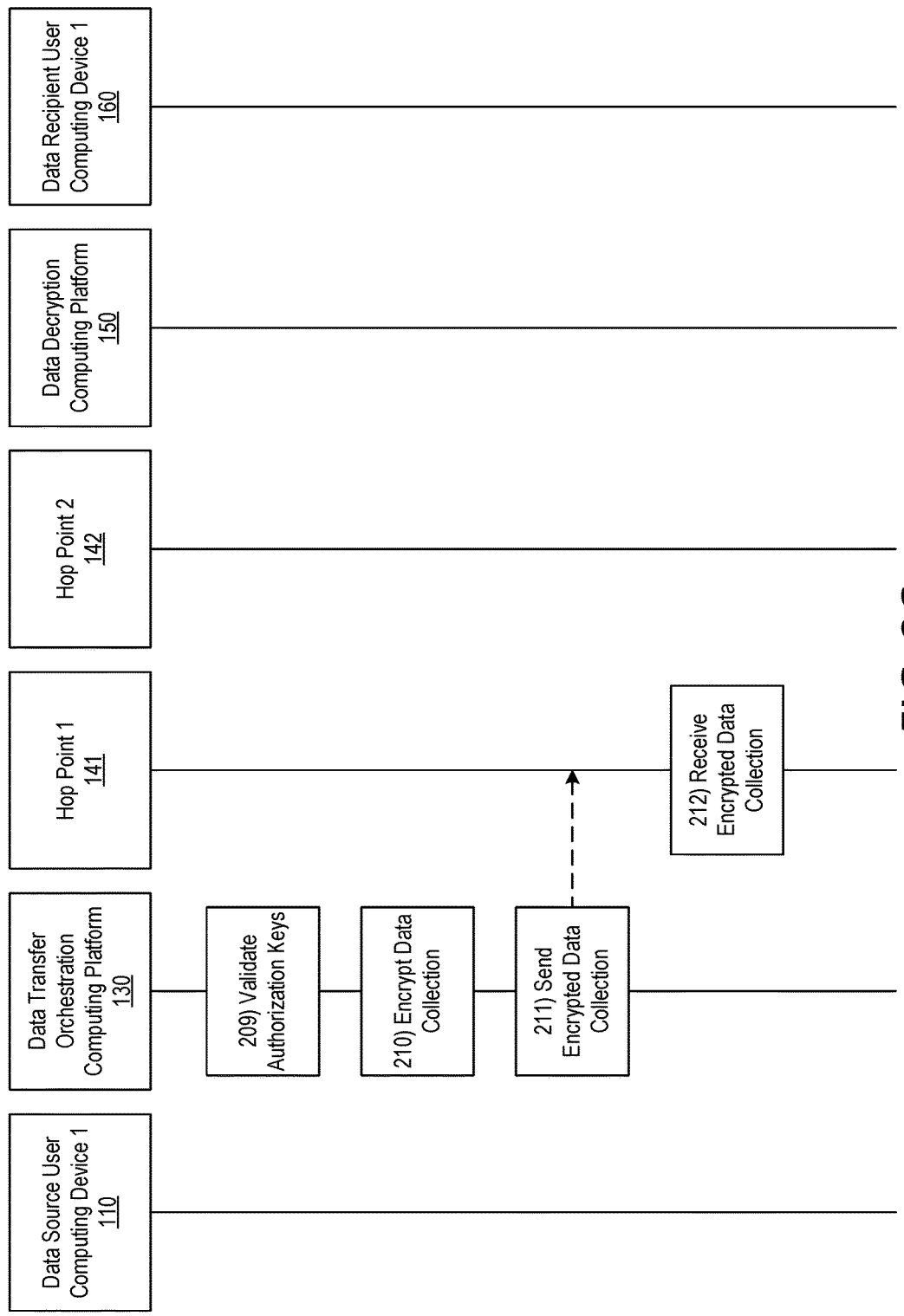

ENSURING INFORMATION SECURITY IN DATA TRANSFERS BY UTILIZING PROXIMITY KEYS

BACKGROUND

Aspects of the disclosure relate to information security, access control and authentication, and computer systems and networks for preventing unauthorized access to resources of enterprise computer systems. In particular, one or more aspects of the disclosure relate to ensuring information security in data transfers by utilizing proximity keys.

Enterprise organizations may utilize various computing infrastructure to maintain large data sets, which may include confidential information and/or other sensitive data that is created and/or used for various purposes. In some instances, these large data sets may need to be transferred across various networks and/or between various computer systems. Ensuring security when transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining and transferring the data.

SUMMARY

Aspects of the disclosure provide effective, efficient, scalable, and convenient technical solutions that address and overcome the technical problems associated with ensuring information security and preventing unauthorized access to resources of enterprise computer systems. In particular, one or more aspects of the disclosure relate to ensuring information security in data transfers by utilizing proximity keys.

In accordance with one or more embodiments, a computing platform having at least one processor, a memory, and a communication interface may receive, via the communication interface, from a first data source user computing device, a data collection comprising one or more data sets to be transferred to one or more remote recipient systems. Subsequently, the computing platform may receive, via the communication interface, from the first data source user computing device, one or more transfer path specifications defining a specific sequence of hop points via which the data collection comprising the one or more data sets is to be transferred to the one or more remote recipient systems. Thereafter, the computing platform may receive, via the communication interface, from a quorum of authorization devices, a plurality of authorization keys. Then, the computing platform may validate the plurality of authorization keys received from the quorum of authorization devices. Based on validating the plurality of authorization keys received from the quorum of authorization devices, the computing platform may encrypt the data collection comprising the one or more data sets using the plurality of authorization keys received from the quorum of authorization devices to produce an encrypted data collection. Then, the computing platform may send, via the communication interface, to a first hop point associated with the specific sequence of hop points defined by the one or more transfer path specifications, the encrypted data collection to initiate a transfer of the data collection comprising the one or more data sets to a data decryption computing platform.

In some embodiments, the first data source user computing device may be linked to a first user associated with a first organization. In addition, the quorum of authorization devices may include the first data source user computing device and at least one other registered user computing device linked to a second user associated with the first organization. In some embodiments, the quorum of authorization devices may include at least half of all available authorization devices associated with the first organization.

In some embodiments, prior to receiving the plurality of authorization keys from the quorum of authorization devices, the computing platform may identify one or more available authorization devices associated with the first organization. The computing platform may generate one or more authorization prompts for the one or more available authorization devices associated with the first organization. Then, the computing platform may send, via the communication interface, to the one or more available authorization devices associated with the first organization, the one or more authorization prompts generated for the one or more available authorization devices associated with the first organization.

In some embodiments, a first authorization key of the plurality of authorization keys received from the quorum of authorization devices may be a biometric authorization key encoded with biometric information specific to a first authorization device that returned the first authorization key in response to a first authorization prompt. In some embodiments, a second authorization key of the plurality of authorization keys received from the quorum of authorization devices may be a geo-location authorization key encoded with geo-location information specific to a second authorization device that returned the second authorization key in response to a second authorization prompt. In some embodiments, a third authorization key of the plurality of authorization keys received from the quorum of authorization devices may be a device-signature authorization key encoded with device-signature information specific to a third authorization device that returned the third authorization key in response to a third authorization prompt.

In some embodiments, the first hop point may be configured to apply a first alternating encryption method to the encrypted data collection using a first proximity key associated with a location of the first hop point to produce a first re-encrypted data collection. In addition, the first hop point may be configured to send the first re-encrypted data collection to a second hop point associated with the specific sequence of hop points defined by the one or more transfer path specifications.

In some embodiments, the second hop point may be configured to apply a second alternating encryption method to the first re-encrypted data collection using a second proximity key associated with a location of the second hop point to produce a second re-encrypted data collection. In addition, the second hop point may be configured to send the second re-encrypted data collection to the data decryption computing platform.

In some embodiments, the data decryption computing platform may be configured to decrypt the second re-encrypted data collection using a third proximity key associated with a location of the data decryption computing platform to reproduce the data collection comprising the one or more data sets. In some embodiments, the data decryption computing platform may be configured to provide one or more data recipient user computing devices with selective access to the data collection comprising the one or more data sets.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for ensuring information security in data transfers by utilizing proximity keys in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to ensuring information security in data transfers. In some embodiments, source data may be encrypted using multiple levels of encryption that each utilizes different keys. For example, a dataset may be encrypted at a first level using a biometric-based encryption key and/or a geo-location-based encryption key. Subsequently, the dataset may be encrypted at a second level using a standard encryption scheme. Then, the dataset may be encrypted at a third level using split key encryption. A source system may receive the biometric-based encryption key and/or the geo-location-based encryption key from the recipient. In some instances, the key may be a dual-feed key to allow multiple users to access the data. In some instances, the different keys may be used to randomly encrypt different parts of the data set prior to the data being transferred. In some instances, this encryption may be performed at different jump points or hop points within a transfer. For instance, a user may encrypt the data with a biometric from an interaction with a mobile or wearable device that enables the user to utilize an alternating algorithm or cipher. The user may encrypt portions of the data set and then send the encrypted data to a hop point. This hop point may analyze the data and may encrypt the data with a proximity encryption (e.g., acting on various data sets within the collection), and subsequently may forward the data to a second hop point. In some instances, two or more users may encrypt or encode certain data elements to prevent one or more users from altering the pre-send data.

Figure 1A:
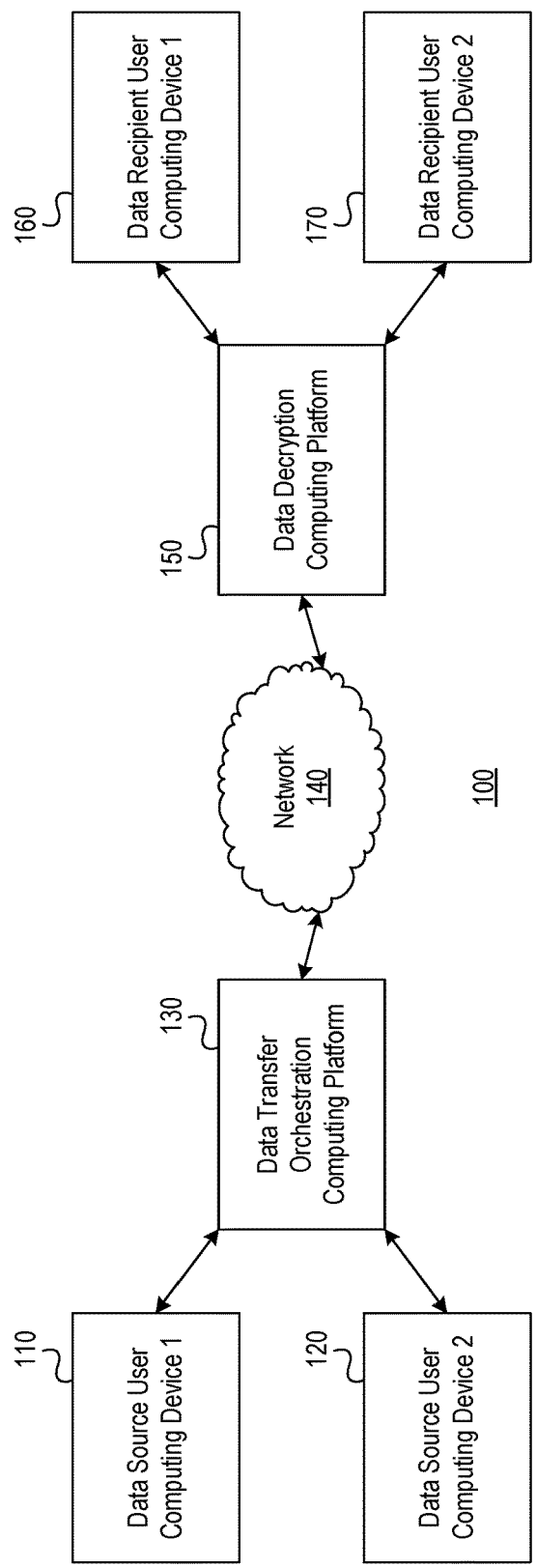
FIGS. 1A, 1B, and 1C depict an illustrative computing environment for ensuring information security in data transfers by utilizing proximity keys in accordance with one or more example embodiments.
Figure 1B:
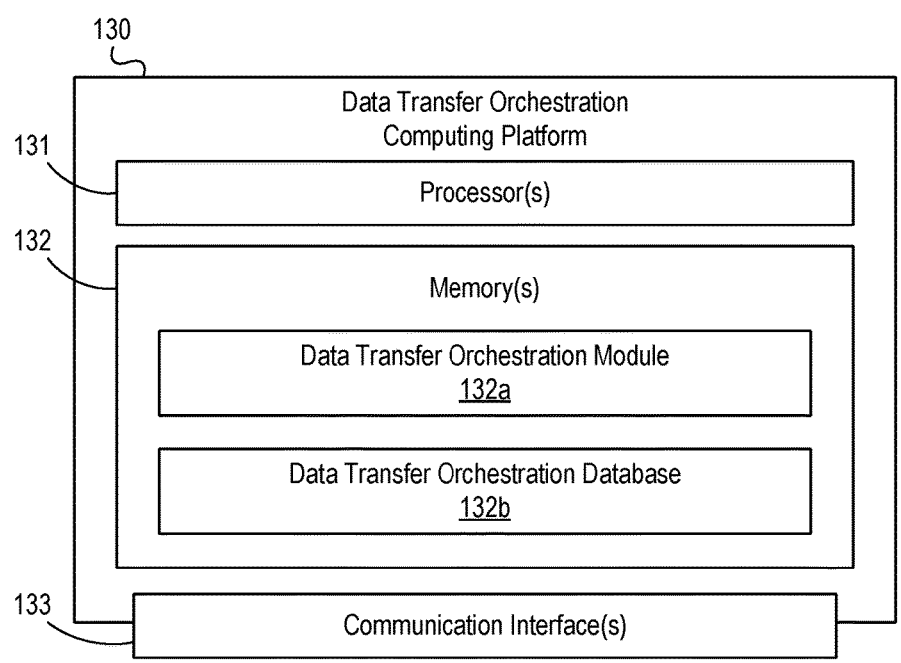
Figure 1C:
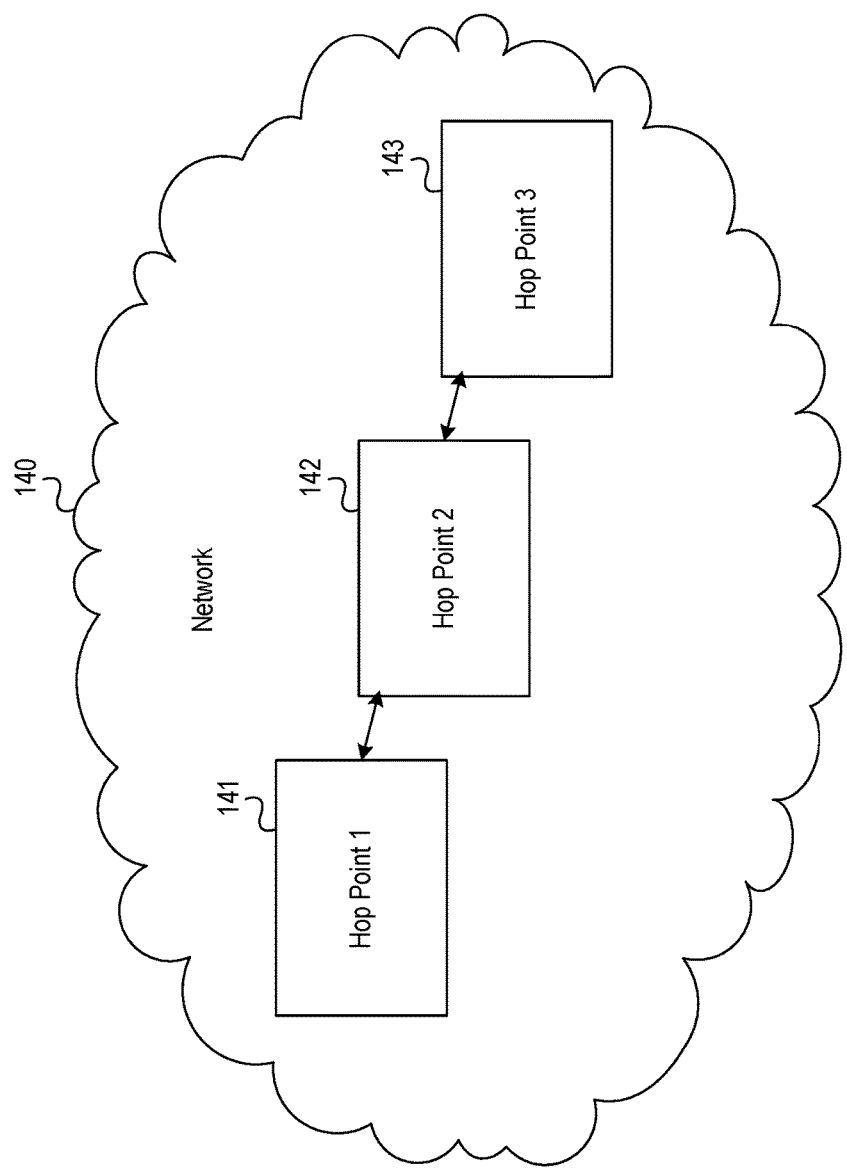

FIGS. 1A, 1B, and 1C depict an illustrative computing environment for ensuring information security in data transfers by utilizing proximity keys in accordance with one or more example embodiments. Referring to FIG. 1A, computing environment 100 may include one or more computer systems. For example, computing environment 100 may include a first data source user computing device 110, a second data source user computing device 120, a data transfer orchestration computing platform 130, a data decryption computing platform 150, a first data recipient user computing device 160, and a second data recipient user computing device 170.

Data source user computing device 110 may be a desktop computer, laptop computer, workstation, or other computing device that is configured to be used by a first user of an organization (e.g., an enterprise organization, such as a financial institution). Data source user computing device 120 may be a desktop computer, laptop computer, workstation, or other computing device that is configured to be used by a second user of an organization (e.g., an enterprise organization, such as a financial institution).

As illustrated in greater detail below, data transfer orchestration computing platform 130 may include one or more computing devices configured to perform one or more of the functions described herein. For example, data transfer orchestration computing platform 130 may include one or more computers (e.g., laptop computers, desktop computers, servers, server blades, or the like). Like data transfer orchestration computing platform 130, data decryption computing platform 150 may include one or more computing devices configured to perform one or more other functions described herein. For example, data decryption computing platform 150 may include one or more computers (e.g., laptop computers, desktop computers, servers, server blades, or the like).

Data recipient user computing device 160 may be a desktop computer, laptop computer, workstation, or other computing device that is configured to be used by a third user of an organization (e.g., an enterprise organization, such as a financial institution). Data recipient user computing device 170 may be a desktop computer, laptop computer, workstation, or other computing device that is configured to be used by a fourth user of an organization (e.g., an enterprise organization, such as a financial institution).

Computing environment 100 also may include one or more networks, which may interconnect one or more of data source user computing device 110, data source user computing device 120, data transfer orchestration computing platform 130, data decryption computing platform 150, data recipient user computing device 160, and data recipient user computing device 170. For example, computing environment 100 may include network 140, which may include one or more private networks, public networks, and/or sub-networks that interconnect one or more of data source user computing device 110, data source user computing device 120, data transfer orchestration computing platform 130, data decryption computing platform 150, data recipient user computing device 160, and data recipient user computing device 170.

In one or more arrangements, data source user computing device 110, data source user computing device 120, data recipient user computing device 160, and data recipient user computing device 170 and/or the other systems included in computing environment 100 may be any type of computing device capable of receiving a user interface, receiving input via the user interface, and communicating the received input to one or more other computing devices. For example, data source user computing device 110, data source user computing device 120, data recipient user computing device 160, and data recipient user computing device 170 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data source user computing device 110, data source user computing device 120, data transfer orchestration computing platform 130, data decryption computing platform 150, data recipient user computing device 160, and data recipient user computing device 170 may, in some instances, be special-purpose computing devices configured to perform specific functions.

Referring to FIG. 1B, data transfer orchestration computing platform 130 may include one or more processor(s) 131, memory(s) 132, and communication interface(s) 133. A data bus may interconnect processor 131, memory 132, and communication interface 133. Communication interface 133 may be a network interface configured to support communication between data transfer orchestration computing platform 130 and one or more networks (e.g., network 140). Memory 132 may include one or more program modules having instructions that when executed by processor 131 cause data transfer orchestration computing platform 130 to perform one or more functions described herein and/or one or more databases that may store and/or otherwise maintain information which may be used by such program modules and/or processor 131. In some instances, the one or more program modules and/or databases may be stored by and/or maintained in different memory units of data transfer orchestration computing platform 130 and/or by different computing devices that may form and/or otherwise make up data transfer orchestration computing platform 130. For example, memory 132 may have, store, and/or include a data transfer orchestration module 132a and a data transfer orchestration database 132b. Data transfer orchestration module 132a may have, store, and/or include instructions that direct and/or cause data transfer orchestration computing platform 130 to manage and/or control one or more data transfers between various computer systems, as discussed in greater detail below. Data transfer orchestration database 132b may store information used by data transfer orchestration module 132a and/or data transfer orchestration computing platform 130 in managing and/or controlling one or more data transfers between various computer systems and/or in performing other functions.

Referring to FIG. 1C, network 140 may include one or more hop points and/or other networking elements. For example, network 140 may include hop point 141, hop point 142, and hop point 143. Hop point 141 may be a server computing device comprising one or more processors, memories, communication interfaces, and/or other components. In addition, hop point 141 may form part of network 140 and/or may be an intermediary system via which one or more data transfers are completed. Similarly, hop point 142 may be a server computing device comprising one or more processors, memories, communication interfaces, and/or other components. In addition, hop point 142 may form part of network 140 and/or may be an intermediary system via which one or more data transfers are completed. Similarly, hop point 143 may be a server computing device comprising one or more processors, memories, communication interfaces, and/or other components. In addition, hop point 143 may form part of network 140 and/or may be an intermediary system via which one or more data transfers are completed. In one or more arrangements, each of hop point 141, hop point 142, and hop point 143 may be located at different physical locations, such as within different physical data centers (which may, e.g., be owned by, operated by, and/or otherwise associated with an organization, such as the enterprise organization utilizing data transfer orchestration computing platform 130 for performing one or more data transfers).

Figure 2A:
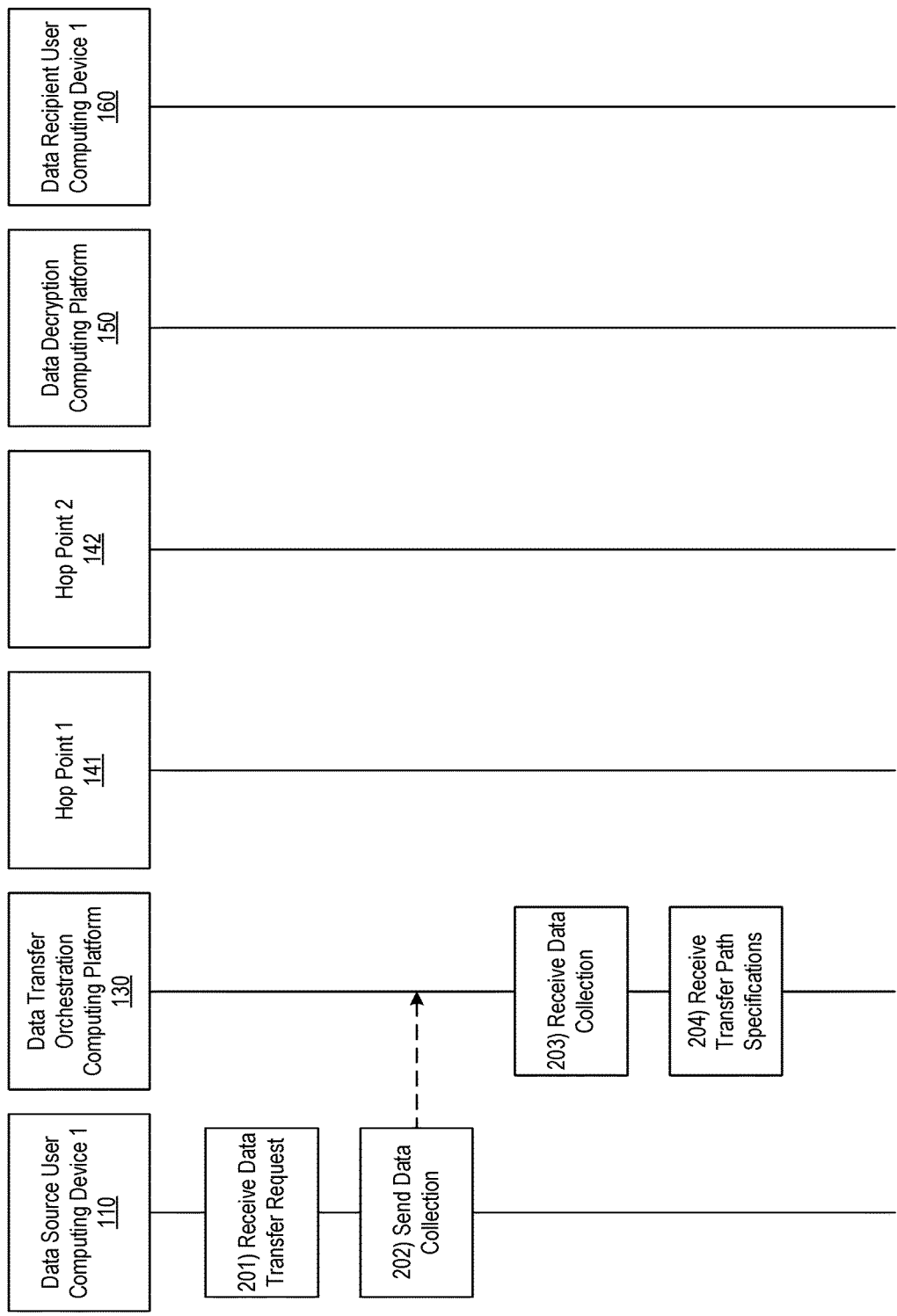

FIGS. 2A, 2B, 2C, 2D, and 2E depict an illustrative event sequence for ensuring information security in data transfers by utilizing proximity keys in accordance with one or more example embodiments. Referring to FIG. 2A, at step 201, data source user computing device 110 may receive a data transfer request. For example, at step 201, data source user computing device 110 may receive a data transfer request based on receiving user input (which may, e.g., identify a data collection to be transferred, specify one or more encryption methods to be used in the transfer, specify one or more transfer paths to be used in the transfer, and/or the like) via one or more user interfaces.

Figure 3:
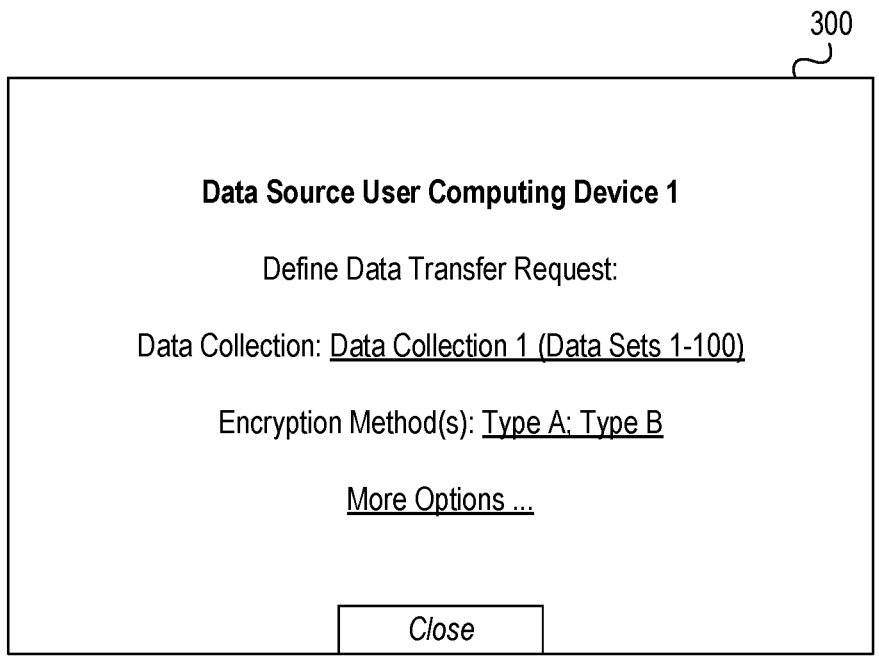
FIGS. 3 and 4 depict example graphical user interfaces for ensuring information security in data transfers by utilizing proximity keys in accordance with one or more example embodiments.
Figure 4:
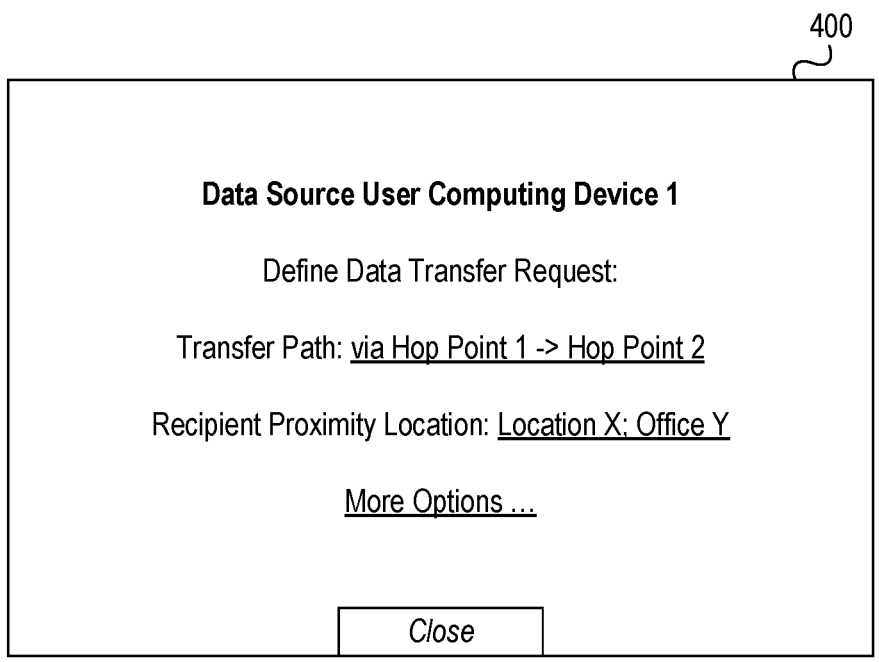

For instance, in receiving the data transfer request, data source user computing device 110 may generate, display, and/or otherwise present one or more graphical user interfaces, such as graphical user interface 300, which is illustrated in FIG. 3, and/or graphical user interface 400, which is illustrated in FIG. 4. As seen in FIG. 3, graphical user interface 300 may include one or more controls allowing a user of data source user computing device 110 to define one or more parameters of a data transfer request, such as one or more controls allowing a user of data source user computing device 110 to select one or more data collections to transfer to one or more specific destination systems, one or more controls allowing a user of data source user computing device 110 to select one or more encryption methods to be used in the transfer, and/or one or more other parameters. As seen in FIG. 4, graphical user interface 400 may include one or more controls allowing a user of data source user computing device 110 to define one or more additional and/or alternative parameters of a data transfer request, such as one or more controls allowing a user of data source user computing device 110 to select a transfer path to be used in the transfer, one or more controls allowing a user of data source user computing device 110 to select a specific location where the encrypted data collection may be decrypted and/or accessed, and/or one or more other parameters.

At step 202, data source user computing device 110 may send a data collection to be transferred to data transfer orchestration computing platform 130. For example, at step 202, data source user computing device 110 may select a data collection to be transferred based on the data transfer request received at step 201 from one or more databases accessible to and/or maintained by data source user computing device 110 and subsequently may transmit the selected data collection to data transfer orchestration computing platform 130. At step 203, data transfer orchestration computing platform 130 may receive the data collection from data source user computing device 110. For example, at step 203, data transfer orchestration computing platform 130 may receive, via the communication interface (e.g., communication interface 133), from a first data source user computing device (e.g., data source user computing device 110), a data collection comprising one or more data sets to be transferred to one or more remote recipient systems (e.g., data decryption computing platform 150, data recipient user computing device 160, data recipient user computing device 170).

At step 204, data transfer orchestration computing platform 130 may receive transfer specifications (e.g., from data source user computing device 110, based on input received by data source user computing device 110 via one or more graphical user interfaces presented by data source user computing device 110, such as graphical user interface 400). For example, at step 204, data transfer orchestration computing platform 130 may receive, via the communication interface (e.g., communication interface 133), from the first data source user computing device (e.g., data source user computing device 110), one or more transfer path specifications defining a specific sequence of hop points via which the data collection comprising the one or more data sets is to be transferred to the one or more remote recipient systems (e.g., data decryption computing platform 150, data recipient user computing device 160, data recipient user computing device 170). For instance, the one or more transfer path specifications may include information defining a specific sequence of hop points included in network 140 via which the data collection is to be transferred, such as via hop point 141, then hop point 142, then hop point 143, and/or the like.

Figure 2B:
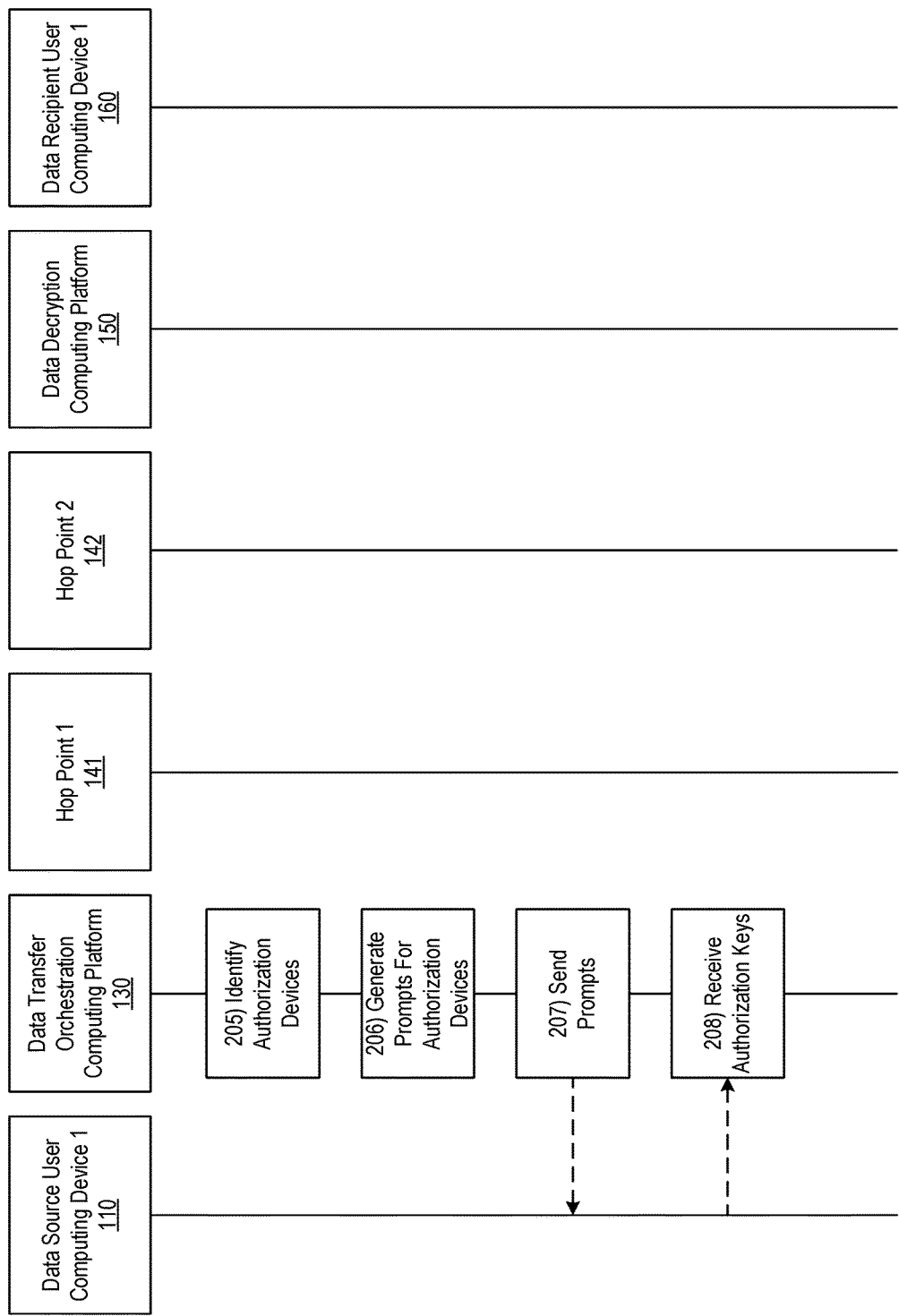

Referring to FIG. 2B, at step 205, data transfer orchestration computing platform 130 may identify one or more authorization devices (which may, e.g., include one or more devices linked to specific users who must provide authorization input authorizing the requested data transfer before the requested data transfer can proceed). In some instances, authorization input received from a quorum of authorization devices might be enough to authorize and initiate the requested data transfer, even if such authorization input is not received from all authorization devices, as discussed in greater detail below. For example, at step 205, data transfer orchestration computing platform 130 may identify one or more available authorization devices (e.g., data source user computing device 110, data source user computing device 120) associated with a first organization. In identifying the one or more available authorization devices associated with the first organization, data transfer orchestration computing platform 130 may, for instance, identify which authorization devices associated with the first organization are online and/or otherwise available to provide authorization input among all known and/or pre-registered authorization devices.

At step 206, data transfer orchestration computing platform 130 may generate one or more prompts for the one or more identified authorization devices. For example, at step 206, data transfer orchestration computing platform 130 may generate one or more authorization prompts for the one or more available authorization devices (e.g., data source user computing device 110, data source user computing device 120) associated with the first organization. At step 207, data transfer orchestration computing platform 130 may send the one or more generated prompts to the one or more identified authorization devices. For example, at step 207, data transfer orchestration computing platform 130 may send, via the communication interface (e.g., communication interface 133), to the one or more available authorization devices (e.g., data source user computing device 110, data source user computing device 120) associated with the first organization, the one or more authorization prompts generated for the one or more available authorization devices (e.g., data source user computing device 110, data source user computing device 120) associated with the first organization.

At step 208, data transfer orchestration computing platform 130 may receive one or more authorization keys (which may, e.g., constitute authorization input authorizing the data transfer to proceed and which further may enable the data collection to be encrypted, as discussed below) from one or more authorization devices. For example, at step 208, data transfer orchestration computing platform 130 may receive, via the communication interface (e.g., communication interface 133), from a quorum of authorization devices (e.g., data source user computing device 110, data source user computing device 120), a plurality of authorization keys.

In some embodiments, the first data source user computing device may be linked to a first user associated with a first organization, and the quorum of authorization devices may include the first data source user computing device and at least one other registered user computing device linked to a second user associated with the first organization. For example, the first data source user computing device (e.g., data source user computing device 110) may be linked to a first user associated with a first organization, and the quorum of authorization devices may include the first data source user computing device (e.g., data source user computing device 110) and at least one other registered user computing device (e.g., data source user computing device 120) linked to a second user associated with the first organization (who may, e.g., be different from the first user associated with the first organization).

In some embodiments, the quorum of authorization devices may include at least half of all available authorization devices associated with the first organization. For example, the quorum of authorization devices (e.g., data source user computing device 110, data source user computing device 120) may include at least half of all available authorization devices associated with the first organization. The available authorization devices associated with the first organization may, for instance, correspond to all computing devices that have been registered (e.g., with data transfer orchestration computing platform 130) as authorization devices and that are currently online. For example, data transfer orchestration computing platform 130 may generate and/or send one or more push notifications to all authorization devices prompting such devices to respond with current status or state information to determine which authorization devices are available and accordingly determine how many authorization devices constitute a quorum in a particular instances.

In some embodiments, a first authorization key of the plurality of authorization keys received from the quorum of authorization devices may be a biometric authorization key encoded with biometric information specific to a first authorization device that returned the first authorization key in response to a first authorization prompt. For example, a first authorization key of the plurality of authorization keys received from the quorum of authorization devices (e.g., data source user computing device 110, data source user computing device 120) may be a biometric authorization key encoded with biometric information specific to a first authorization device (e.g., data source user computing device 110) that returned the first authorization key in response to a first authorization prompt. Such biometric information may, for instance, uniquely identify and/or correspond to a user of data source user computing device 110, such as the user's fingerprint, voiceprint, facial image, retinal image, and/or the like.

In some embodiments, a second authorization key of the plurality of authorization keys received from the quorum of authorization devices may be a geo-location authorization key encoded with geo-location information specific to a second authorization device that returned the second authorization key in response to a second authorization prompt. For example, a second authorization key of the plurality of authorization keys received from the quorum of authorization devices (e.g., data source user computing device 110, data source user computing device 120) may be a geo-location authorization key encoded with geo-location information specific to a second authorization device (e.g., data source user computing device 120) that returned the second authorization key in response to a second authorization prompt. Such geo-location information may, for instance, uniquely identify and/or correspond to a location of data source user computing device 120, such as geographic coordinates specifying the current location of data source user computing device 120 and/or contextual information identifying a name or label for the current location of data source user computing device 120.

In some embodiments, a third authorization key of the plurality of authorization keys received from the quorum of authorization devices may be a device-signature authorization key encoded with device-signature information specific to a third authorization device that returned the third authorization key in response to a third authorization prompt. For example, a third authorization key of the plurality of authorization keys received from the quorum of authorization devices (e.g., data source user computing device 110, data source user computing device 120) may be a device-signature authorization key encoded with device-signature information specific to a third authorization device (e.g., another authorization device different from data source user computing device 110 and data source user computing device 120) that returned the third authorization key in response to a third authorization prompt. Such device-signature information may, for instance, uniquely identify and/or correspond to the authorization device, such as the device's serial number, globally unique identifier, and/or the like.

Referring to FIG. 2C, at step 209, data transfer orchestration computing platform 130 may validate the one or more authorization keys (e.g., by confirming that an encryption key authorizing the data transfer to proceed has been received from at least a quorum of the available authorization devices). For example, at step 209, data transfer orchestration computing platform 130 may validate the plurality of authorization keys received from the quorum of authorization devices (e.g., data source user computing device 110, data source user computing device 120).

At step 210, data transfer orchestration computing platform 130 may encrypt the data collection (e.g., using the plurality of authorization keys received from the quorum of authorization devices (e.g., data source user computing device 110, data source user computing device 120), based on the initial specifications for the data transfer received from data source user computing device 110). For example, at step 210, based on validating the plurality of authorization keys received from the quorum of authorization devices (e.g., data source user computing device 110, data source user computing device 120), data transfer orchestration computing platform 130 may encrypt the data collection comprising the one or more data sets using the plurality of authorization keys received from the quorum of authorization devices (e.g., data source user computing device 110, data source user computing device 120) to produce an encrypted data collection.

At step 211, data transfer orchestration computing platform 130 may send the encrypted data collection to data decryption computing platform 150 via hop point 141 and hop point 142 (e.g., by sending the encrypted data collection to one or more specific hop point(s) according to the transfer path specifications received from data source user computing device 110). For example, at step 211, data transfer orchestration computing platform 130 may send, via the communication interface (e.g., communication interface 133), to a first hop point (e.g., hop point 141) associated with the specific sequence of hop points defined by the one or more transfer path specifications, the encrypted data collection, so as to initiate a transfer of the data collection comprising the one or more data sets to a data decryption computing platform (e.g., data decryption computing platform 150).

At step 212, hop point 141 may receive the encrypted data collection. In some embodiments, the first hop point may be configured to apply a first alternating encryption method to the encrypted data collection using a first proximity key associated with a location of the first hop point to produce a first re-encrypted data collection. In addition, the first hop point may be configured to send the first re-encrypted data collection to a second hop point associated with the specific sequence of hop points defined by the one or more transfer path specifications.

Figure 2D:
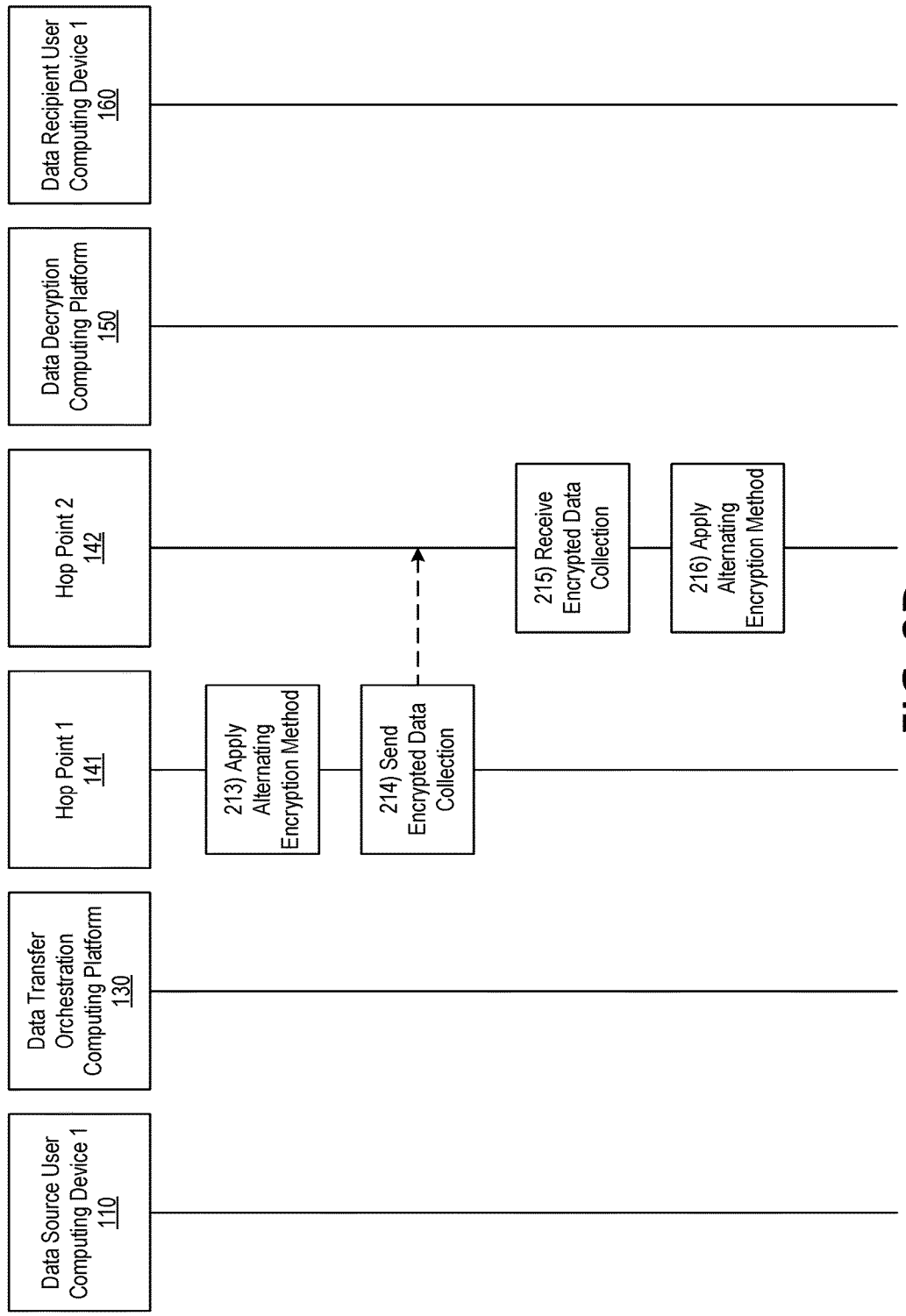
Figure 2E:
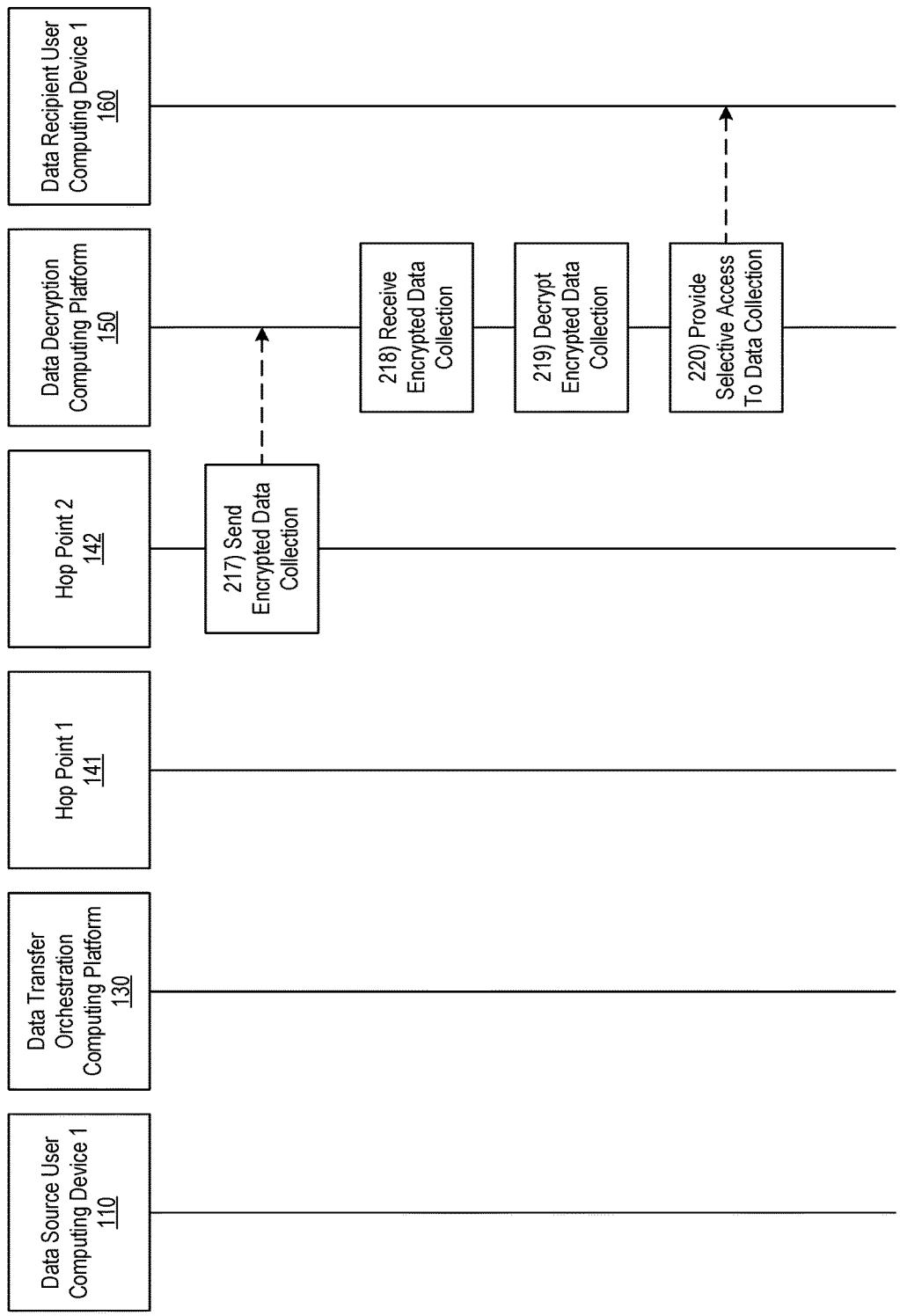

For example, referring to FIG. 2D, at step 213, hop point 141 may apply a first alternating encryption method to the encrypted data collection using a first proximity key associated with a location of the first hop point (e.g., hop point 141) to produce a first re-encrypted data collection. In applying the first alternating encryption method to the encrypted data collection using the first proximity key associated with the location of the first hop point (e.g., hop point 141), hop point 141 may, for instance, re-encrypt part or all of the data collection received from data transfer orchestration computing platform 130 using a specific encryption algorithm and the first proximity key. Subsequently, at step 214, hop point 141 may send the first re-encrypted data collection to a second hop point (e.g., hop point 142) associated with the specific sequence of hop points defined by the one or more transfer path specifications.

At step 215, hop point 142 may receive the data collection from hop point 141. In some embodiments, the second hop point may be configured to apply a second alternating encryption method to the first re-encrypted data collection using a second proximity key associated with a location of the second hop point to produce a second re-encrypted data collection. In addition, the second hop point may be configured to send the second re-encrypted data collection to the data decryption computing platform. For instance, the second hop point may be configured to send the second re-encrypted data collection to the data decryption computing platform in accordance with the specific sequence of hop points defined by the one or more transfer path specifications.

For example, at step 216, hop point 142 may apply a second alternating encryption method to the first re-encrypted data collection using a second proximity key associated with a location of the second hop point (e.g., hop point 142) to produce a second re-encrypted data collection. In applying the second alternating encryption method to the first re-encrypted data collection using the second proximity key associated with the location of the second hop point (e.g., hop point 142), hop point 142 may, for instance, re-encrypt part or all of the data collection received from hop point 141 using a specific encryption algorithm and the second proximity key. Subsequently, referring to FIG. 2E, at step 217, hop point 142 may send the second re-encrypted data collection to the data decryption computing platform (e.g., data decryption computing platform 150). For instance, hop point 142 may send the second re-encrypted data collection to data decryption computing platform 150 in accordance with the specific sequence of hop points defined by the one or more transfer path specifications initially received by data transfer orchestration computing platform 130 from data source user computing device 110.

At step 218, data decryption computing platform 150 may receive the encrypted data collection from hop point 142. In some embodiments, the data decryption computing platform may be configured to decrypt the second re-encrypted data collection using a third proximity key associated with a location of the data decryption computing platform to reproduce the data collection comprising the one or more data sets. For example, at step 219, data decryption computing platform 150 may decrypt the second re-encrypted data collection using a third proximity key associated with a location of the data decryption computing platform (e.g., data decryption computing platform 150) to reproduce the data collection comprising the one or more data sets. In some instances, the third proximity key associated with the location of the data decryption computing platform (e.g., data decryption computing platform 150) may facilitate the complete decryption of the data collection (which may, e.g., have originated from data source user computing device 110 and data transfer orchestration computing platform 130, as illustrated above). For instance, the third proximity key associated with the location of the data decryption computing platform (e.g., data decryption computing platform 150) may enable data decryption computing platform 150 to decode the alternating encryption pattern applied to the data collection at the hop points (e.g., hop point 141, hop point 142) and the encryption applied to the data collection by data transfer orchestration computing platform 130 using the plurality of authorization keys received from the quorum of authorization devices (e.g., data source user computing device 110, data source user computing device 120).

In some embodiments, the data decryption computing platform may be configured to provide one or more data recipient user computing devices with selective access to the data collection comprising the one or more data sets. For example, at step 220, data decryption computing platform 150 may provide one or more data recipient user computing devices (e.g., data recipient user computing device 160, data recipient user computing device 170) with selective access to the data collection comprising the one or more data sets. In providing the one or more data recipient user computing devices (e.g., data recipient user computing device 160, data recipient user computing device 170) with selective access to the data collection comprising the one or more data sets, data decryption computing platform 150 may, for instance, generate and/or send one or more notifications to data recipient user computing device 160 and/or data recipient user computing device 170, authenticate one or more users of data recipient user computing device 160 and/or data recipient user computing device 170, and/or selectively provide data recipient user computing device 160 and/or data recipient user computing device 170 with access to data obtained from and/or otherwise associated with the data collection.

Subsequently, the example event sequence may end. In one or more arrangements, various steps may be repeated, omitted, performed in a different order, and/or performed simultaneously, for instance, to facilitate multiple transfers of different data collections between data transfer orchestration computing platform 130, data decryption computing platform 150, and/or one or more other systems and/or devices. In one or more additional and/or alternative arrangements, data transfer orchestration computing platform 130 and/or one or more other systems included in computing environment 100 may perform steps similar to those discussed above to facilitate data transfers via physical media, such as via magnetic tapes, flash drives, and/or other physical media, and the data collections involved in such physical-media data transfers may be similarly re-encrypted using various proximity keys at various hop points and ultimately decrypted and accessed at predefined locations using other location-specific proximity keys.

Figure 5:
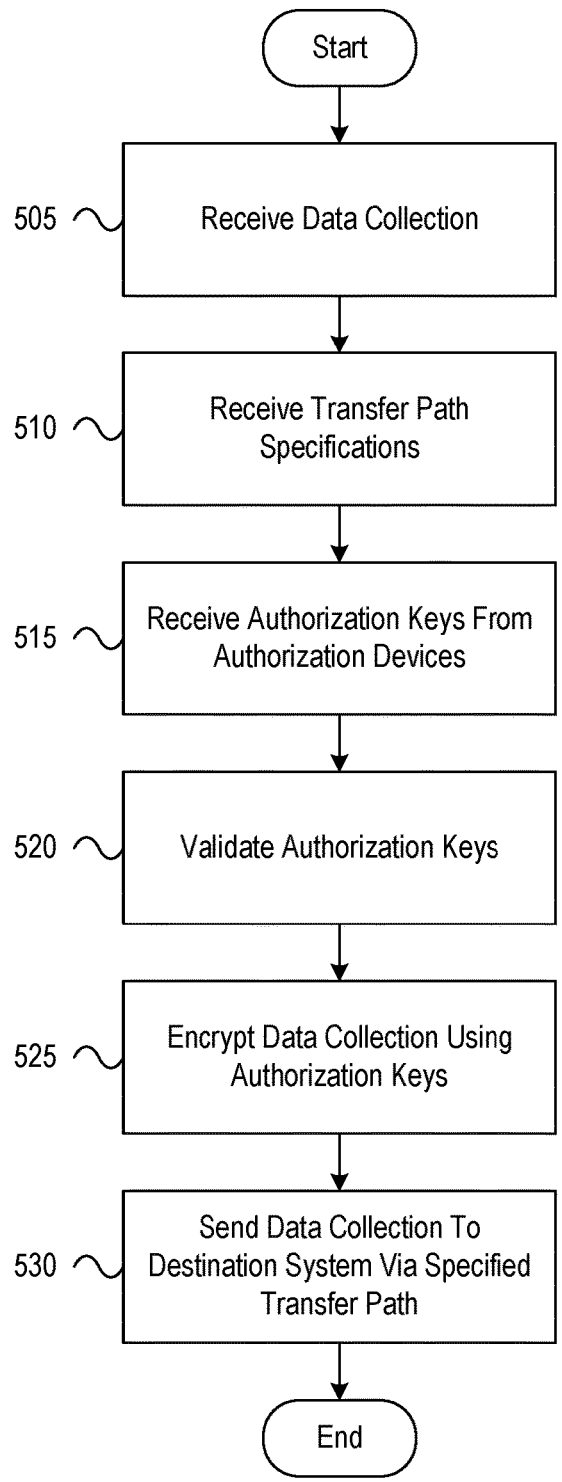
FIG. 5 depicts an illustrative method for ensuring information security in data transfers by utilizing proximity keys in accordance with one or more example embodiments.

FIG. 5 depicts an illustrative method for ensuring information security in data transfers by utilizing proximity keys in accordance with one or more example embodiments. Referring to FIG. 5, at step 505, a computing platform having at least one processor, a communication interface, and memory may receive, via the communication interface, from a first data source user computing device, a data collection comprising one or more data sets to be transferred to one or more remote recipient systems. At step 510, the computing platform may receive, via the communication interface, from the first data source user computing device, one or more transfer path specifications defining a specific sequence of hop points via which the data collection comprising the one or more data sets is to be transferred to the one or more remote recipient systems. At step 515, the computing platform may receive, via the communication interface, from a quorum of authorization devices, a plurality of authorization keys. At step 520, the computing platform may validate the plurality of authorization keys received from the quorum of authorization devices. At step 525, based on validating the plurality of authorization keys received from the quorum of authorization devices, the computing platform may encrypt the data collection comprising the one or more data sets using the plurality of authorization keys received from the quorum of authorization devices to produce an encrypted data collection. At step 530, the computing platform may send, via the communication interface, to a first hop point associated with the specific sequence of hop points defined by the one or more transfer path specifications, the encrypted data collection to initiate a transfer of the data collection comprising the one or more data sets to a data decryption computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one hardware processor;
   a communication interface communicatively coupled to the at least one hardware processor; and
   memory storing computer-readable instructions that, when executed by the at least one hardware processor, cause the computing platform to:
   receive, via the communication interface, from a first data source user computing device, a data collection comprising one or more data sets to be transferred to one or more remote recipient computer systems;
   receive, via the communication interface, from the first data source user computing device, one or more transfer path specifications defining a specific sequence of hop points via which the data collection comprising the one or more data sets is to be transferred to the one or more remote recipient computer systems;
   receive, via the communication interface, from a quorum of authorization devices, a plurality of authorization keys;
   validate the plurality of authorization keys received from the quorum of authorization devices;
   based on validating the plurality of authorization keys received from the quorum of authorization devices, encrypt the data collection comprising the one or more data sets using the plurality of authorization keys received from the quorum of authorization devices to produce an encrypted data collection; and
   send, via the communication interface, to a first hop point associated with the specific sequence of hop points defined by the one or more transfer path specifications, the encrypted data collection to initiate a transfer of the data collection comprising the one or more data sets to a data decryption computing platform comprising one or more computing devices.

2. The computing platform of claim 1, wherein the first data source user computing device is linked to a first user associated with a first organization, and wherein the quorum of authorization devices comprises the first data source user computing device and at least one other registered user computing device linked to a second user associated with the first organization.

3. The computing platform of claim 2, wherein the quorum of authorization devices comprises at least half of all available authorization devices associated with the first organization.

4. The computing platform of claim 2, wherein the memory stores additional computer-readable instructions that, when executed by the at least one hardware processor, cause the computing platform to:
   prior to receiving the plurality of authorization keys from the quorum of authorization devices:
   identify one or more available authorization devices associated with the first organization;
   generate one or more authorization prompts for the one or more available authorization devices associated with the first organization; and
   send, via the communication interface, to the one or more available authorization devices associated with the first organization, the one or more authorization prompts generated for the one or more available authorization devices associated with the first organization.

5. The computing platform of claim 4, wherein a first authorization key of the plurality of authorization keys received from the quorum of authorization devices is a biometric authorization key encoded with biometric information specific to a first authorization device that returned the first authorization key in response to a first authorization prompt.

6. The computing platform of claim 5, wherein a second authorization key of the plurality of authorization keys received from the quorum of authorization devices is a geo-location authorization key encoded with geo-location information specific to a second authorization device that returned the second authorization key in response to a second authorization prompt.

7. The computing platform of claim 6, wherein a third authorization key of the plurality of authorization keys received from the quorum of authorization devices is a device-signature authorization key encoded with device-signature information specific to a third authorization device that returned the third authorization key in response to a third authorization prompt.

8. The computing platform of claim 1, wherein the first hop point is configured to:
   apply a first alternating encryption method to the encrypted data collection using a first proximity key associated with a location of the first hop point to produce a first re-encrypted data collection; and send the first re-encrypted data collection to a second hop point associated with the specific sequence of hop points defined by the one or more transfer path specifications.

9. The computing platform of claim 8, wherein the second hop point is configured to:
   apply a second alternating encryption method to the first re-encrypted data collection using a second proximity key associated with a location of the second hop point to produce a second re-encrypted data collection; and
   send the second re-encrypted data collection to the data decryption computing platform.

10. The computing platform of claim 9, wherein the data decryption computing platform is configured to decrypt the second re-encrypted data collection using a third proximity key associated with a location of the data decryption computing platform to reproduce the data collection comprising the one or more data sets.

11. The computing platform of claim 10, wherein the data decryption computing platform is configured to provide one or more data recipient user computing devices with selective access to the data collection comprising the one or more data sets.

12. A method, comprising:
   at a computing platform comprising at least one hardware processor, memory, and a communication interface:
   receiving, by the at least one hardware processor, via the communication interface, from a first data source user computing device, a data collection comprising one or more data sets to be transferred to one or more remote recipient computer systems;
   receiving, by the at least one processor hardware processor, via the communication interface, from the first data source user computing device, one or more transfer path specifications defining a specific sequence of hop points via which the data collection comprising the one or more data sets is to be transferred to the one or more remote recipient computer systems;
   receiving, by the at least one hardware processor, via the communication interface, from a quorum of authorization devices, a plurality of authorization keys;
   validating, by the at least one hardware processor, the plurality of authorization keys received from the quorum of authorization devices;
   based on validating the plurality of authorization keys received from the quorum of authorization devices, encrypting, by the at least one hardware processor, the data collection comprising the one or more data sets using the plurality of authorization keys received from the quorum of authorization devices to produce an encrypted data collection; and
   sending, by the at least one hardware processor, via the communication interface, to a first hop point associated with the specific sequence of hop points defined by the one or more transfer path specifications, the encrypted data collection to initiate a transfer of the data collection comprising the one or more data sets to a data decryption computing platform comprising one or more computing devices.

13. The method of claim 12, wherein the first data source user computing device is linked to a first user associated with a first organization, and wherein the quorum of authorization devices comprises the first data source user computing device and at least one other registered user computing device linked to a second user associated with the first organization.

14. The method of claim 13, wherein the quorum of authorization devices comprises at least half of all available authorization devices associated with the first organization.

15. The method of claim 13, comprising:
   prior to receiving the plurality of authorization keys from the quorum of authorization devices:
   identifying, by the at least one hardware processor, one or more available authorization devices associated with the first organization;
   generating, by the at least one hardware processor, one or more authorization prompts for the one or more available authorization devices associated with the first organization; and
   sending, by the at least one hardware processor, via the communication interface, to the one or more available authorization devices associated with the first organization, the one or more authorization prompts generated for the one or more available authorization devices associated with the first organization.

16. The method of claim 15, wherein a first authorization key of the plurality of authorization keys received from the quorum of authorization devices is a biometric authorization key encoded with biometric information specific to a first authorization device that returned the first authorization key in response to a first authorization prompt.

17. The method of claim 16, wherein a second authorization key of the plurality of authorization keys received from the quorum of authorization devices is a geo-location authorization key encoded with geo-location information specific to a second authorization device that returned the second authorization key in response to a second authorization prompt.

18. The method of claim 17, wherein a third authorization key of the plurality of authorization keys received from the quorum of authorization devices is a device-signature authorization key encoded with device-signature information specific to a third authorization device that returned the third authorization key in response to a third authorization prompt.

19. The method of claim 12, wherein the first hop point is configured to:
   apply a first alternating encryption method to the encrypted data collection using a first proximity key associated with a location of the first hop point to produce a first re-encrypted data collection; and
   send the first re-encrypted data collection to a second hop point associated with the specific sequence of hop points defined by the one or more transfer path specifications.

20. One or more non-transitory computer-readable media storing instructions that, when executed by a computing platform comprising at least one hardware processor, memory, and a communication interface, cause the computing platform to:
   receive, via the communication interface, from a first data source user computing device, a data collection comprising one or more data sets to be transferred to one or more remote recipient computer systems;
   receive, via the communication interface, from the first data source user computing device, one or more transfer path specifications defining a specific sequence of hop points via which the data collection comprising the one or more data sets is to be transferred to the one or more remote recipient computer systems;
   receive, via the communication interface, from a quorum of authorization devices, a plurality of authorization keys;

validate the plurality of authorization keys received from the quorum of authorization devices;

based on validating the plurality of authorization keys received from the quorum of authorization devices, encrypt the data collection comprising the one or more data sets using the plurality of authorization keys received from the quorum of authorization devices to produce an encrypted data collection; and send, via the communication interface, to a first hop point associated with the specific sequence of hop points defined by the one or more transfer path specifications, the encrypted data collection to initiate a transfer of the data collection comprising the one or more data sets to a data decryption computing platform comprising one or more computing devices.

\* \* \* \* \*